Aug. 12, 1969     F. POULSEN     3,460,274

TACHISTOSCOPE

Filed Sept. 22, 1967     2 Sheets-Sheet 1

Aug. 12, 1969  F. POULSEN  3,460,274
TACHISTOSCOPE

Filed Sept. 22, 1967  2 Sheets-Sheet 2

United States Patent Office 3,460,274
Patented Aug. 12, 1969

3,460,274
TACHISTOSCOPE
Find Poulsen, 29 Stadionvej, Glostrup, Denmark
Filed Sept. 22, 1967, Ser. No. 669,917
Claims priority, application Denmark, Sept. 23, 1966,
4,952/66
Int. Cl. G09b 17/04
U.S. Cl. 35—35                                    7 Claims

ABSTRACT OF THE DISCLOSURE

A tachistoscope which contains a transparent mirror, arranged to prevent the trainee from seeing a text used for improving his reading ability in periods when a source of light inside the tachistoscope is not lighted. In the present tachistoscope, the transparent mirror is so placed that it reflects the mirror image of the viewer into the interior of the tachistoscope, whereby his eyes do not accommodate to that image while said source of light is switched off.

Background of the invention

The present invention relates to a tachistoscope.

A tachistoscope is a device which increases the reading field of the student, longer words, and subsequently sentences, of increasing length both successive in glimpses of decreasing duration.

One device which has become popular is one which can be used both as tachistoscope and as reading accelerator. Such devices use a spy-mirror, i.e. a mirror which is transparent when it is illuminated from the rear but not when it is illuminated only from the front.

When such an apparatus is used as a tachistoscope, tape upon which the text is written is conveyed behind the mirror in synchronism with an intermittently illuminated lamp, so that the text is only illuminated intermittently and the length of the glimpse is synchronized with the conveying speed of the tape. The transparent mirror must be situated over the front opening, because its function is to prevent light from passing from outside into the box so as to allow the pupil to see the text between the glimpses, i.e. when the lamp is put off, since the pupil must not see the text in these intervals.

It has, however, been found that this creates a serious inconvenience. When the lamp is switched off, the transparent mirror acts solely as a mirror, and it is thereby unavoidable that it reflects a mirror image of the viewer. Since the eye of the viewer is a normal reading distance from the text and since the distance inside the apparatus from the text to the mirror is much smaller than the distance from the mirror to the eye, the formation of the mirror image causes the eye to accommodate to the mirror image, i.e. to a somewhat greater viewing distance than the text; conversely, the eye will try to accommodate to the reading distance when the lamp is switched on. These incessant accommodations are tiring to the eye, and they require time so that both the pupil and the teacher get an inexact assay of the speed with which he reads the tachistoscope text. The speed of accommodation is different from one individual to another so that it is not possible to correct for this by the introduction of a fixed correction factor.

Summary of the invention

It is an object of the present invention to overcome the drawbacks in the prior art discussed above. To this end a transparent mirror is placed between the opening or interspace between the said fixedly arranged covering means in the interior of the apparatus and the window or opening in the front at such an angle that the transparent mirror reflects substantially all of the mirror image of the viewer into the interior of the apparatus.

Detailed description of the preferred embodiment

Figure 1:
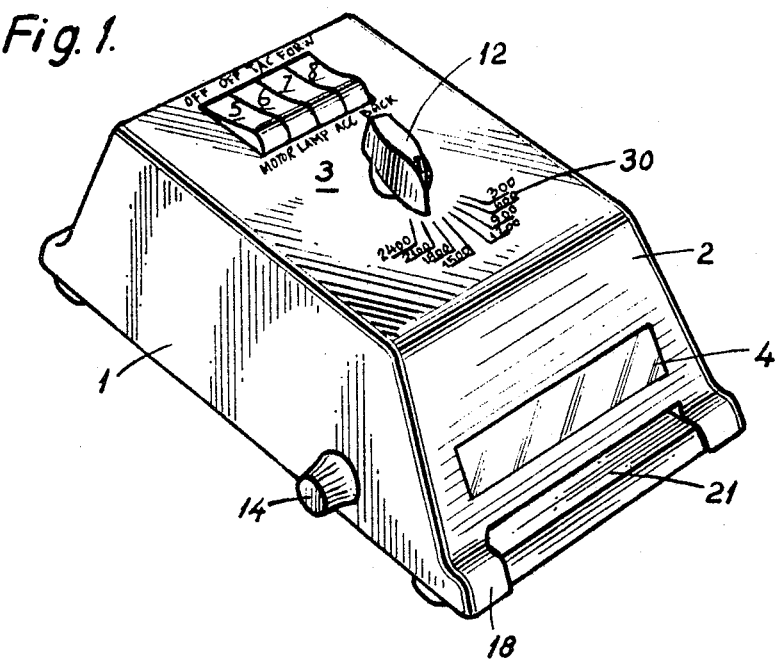
FIG. 1 shows apparatus made in accordance with the present invention in perspective.

The apparatus according to the invention comprises a housing 1 with a front wall 2, a top wall 3, side walls, rear wall and bottom. The front wall 2 forms in the embodiment shown an angle of 45° with the horizontal plane. In the front wall there is an opening or window 4 through which the viewer can read a text. On the top wall there are four switches 5–8 of any convenient type. The switch 5 is by aid of electric lines (not shown) adapted to start and stop a reversible electromotor 9 positioned in the housing. The switch 6 switches on or off a lamp 10 also placed in the housing. The switch 7 determines whether the apparatus is used as a tachistoscope or reading accelerator. It is connected with electric lines (not shown) and suitable mechanisms, as well as with the lamp 10 in such a manner that this lamp at the switch-position ACC is under constant voltage and when the switch 6 is open shines constantly. When switch 7 is set at the position TAC, the lamp 10 does not shine constantly, but gets its voltage over a microswitch (not shown) which is activated by a star wheel (not shown) in such manner that the lamp 10 gives a short glimpse a certain number of times, in the embodiment shown three times for each full rotation of a roller 11. This roller is driven from the motor 9 by a gear transmission, and since the rotation speed of the motor is adjustable by aid of a regulator button 12, and since the rotational speed of the roller 11 is adjustable, the speed of flashing of the lamp is adujstable since this is dependent on the speed of rotation of the roller.

Figure 3:
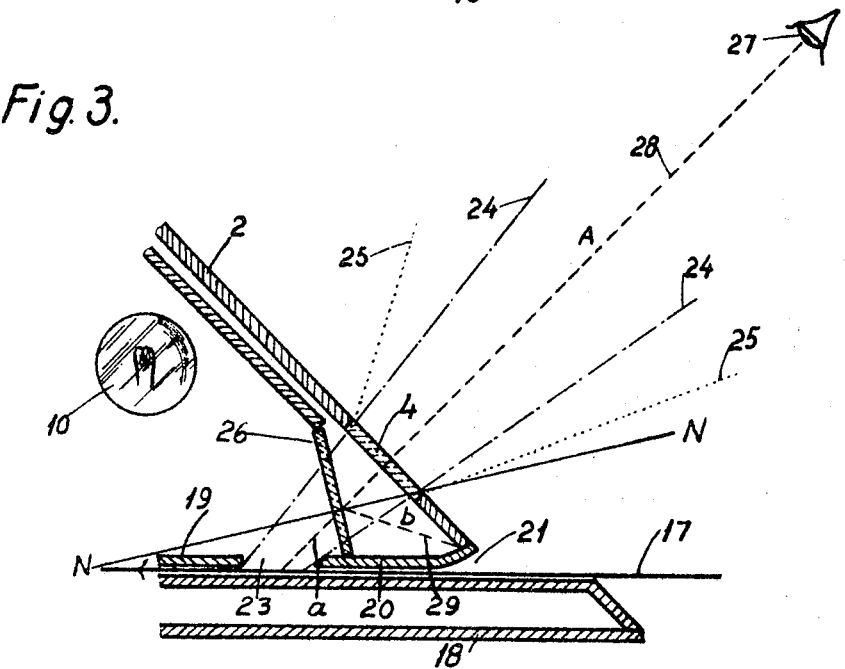
Figure 2:
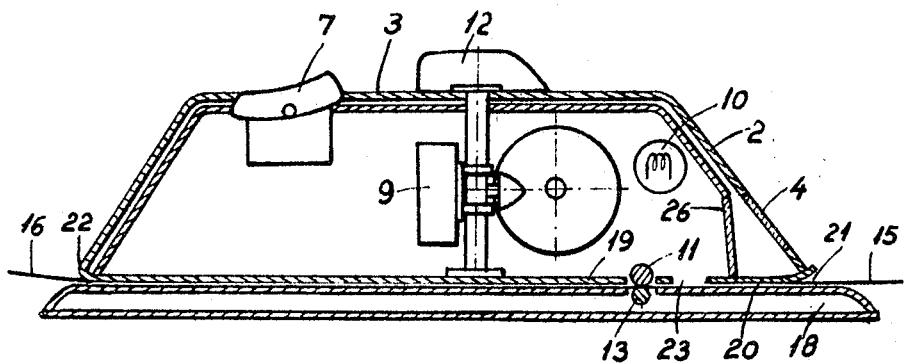
FIG. 2 shows the same in longitudinal section and, FIG. 3 shows a longitudinal section through the front part of the apparatus, in larger scale than FIG. 2.

The roller 11 is coated with a frictional material, for instance rubber, and serves together with an idle roller 13 to convey a tape or band or other suitable material on which the desired training material such as single words, whole sentences or a coherent text has been written or printed. The shaft of the roller 11 projects through the side wall of housing 1 and is provided on its projecting end with a button 14, so that roller 11 may also be operated manually. The paper tape is shown in FIG. 2 as a couple of heavy lines 15 and 16 outside of the apparatus. The tape extends within and through the apparatus. In FIG. 3 the paper tape is shown as a heavy line 17 all through the apparatus. An arrow indicates the conveying direction when the apparatus is used as a reading accelerator or tachistoscope. Inside the apparatus the path of the tape is horizontal passing through a broad and long slit and supported by the bottom 18 of the apparatus. The top of the slit is defined by interior cover plates 19 and 20. The rollers 11 and 13 contact the paper tape through openings in the bottom 18 and the plate 19. There are inner sideplates and supporting plates, not to be explained in detail.

The paper-web, which may expediently be wound into a reel which may be journaled on a roller outside the housing 1, is, when the apparatus is used as tachistoscope or reading accelerator introduced into the said slit through a slot 21 in the front wall of the apparatus, and it leaves the apparatus through a corresponding slot 22 in the rear wall. When the apparatus is used as a pacer, the paper tape is replaced by a sheet which may be an elastic plate of an opaque material. This plate is introduced to the slit through slot 22 and leaves the apparatus through the slot 21 and for this purpose the apparatus is provided with a switch 8 which when the present device is used as a reading accelerator and tachistoscope is set at FORW, but when used as pacer is set at BACK, the switch 8 being adapted to reverse via a condenser the rotational direction of the motor 9 and hence the direction of roller 11. When the apparatus is used as pacer the plate runs out through the front end of the apparatus and accordingly will cover a book or other normal text situated just in front of the apparatus, the speed of the covering of the said text being determined by the setting of the regulator button 12. The apparatus may be provided with suitable, preferably adjustable, holding means for the book. This arrangement has the advantage that the trainee is prevented from looking back on the text which has been already read and now covered by the plate. When the apparatus is used as pacer, the lamp 10 switched off.

As mentioned hereinbefore the path of the paper web or the plate is limited when inside the apparatus from upward movement by cover plates 19, 20. These may be replaced by other obstacles for the view. Between these screenings there is an opening 23 through which a certain, predetermined amount of text is visible when a text tape has been inserted in the apparatus. The viewer can see the text through opening 23 and window 4, and these two openings define a field of vision limited by the lines which in FIG. 3 are shown as dot and dash lines 24, defined by the upper and under edges, respectively, of the two openings. By the upper edge of opening 23 is meant that edge shown at the left in the drawing, since this is the upper edge with respect to the text read. An enlarged field of vision, comprising only part of the text, is defined by dotted lines 25, but the eyes of the trainee should be kept within the field limited by lines 24, and in this patent the phrase "field of vision" refers to this field.

Inside the apparatus there is situated in the field of vision a transparent mirror sometimes called a spy-mirror which is transparent when illuminated from behind, but reflects light when this is not the case. When the lamp, which for instance may be an incandescent lamp of 25 watt size, is switched on, it will illuminate the text in the opening 23 and this may therefore be read by the trainee when his eyes are situated in the field of vision. The trainee is symbolized by an eye 27 in FIG. 3. In that case the mirror 26 only acts as an extra pane of glass. When the lamp is switched off, light which penetrates into the apparatus might allow the trainee to read a text shown in the opening 23. Since this should be avoided for the pedagogical reasons for which the apparatus has been constructed, there must be a barrier for the view. This barrier is the transparent mirror 26 which acts as a tight screen when the lamp 10 is switched off.

If the mirror did form substantially a right angle with the longitudinal direction of the field of vision, for instance if it were perpendicular to a ray of light as indicated by a broken line 28, it would show a mirror image of the viewer, as symbolized by the eye 27, when the lamp 10 was switched off. Since the distance between eye 27 and mirror 26 is A, eye 27 would then have a tendency to accommodate to the distance 2A. When the lamp is lighted, the eye would have to accommodate to the considerably smaller distance A+a, which is the total distance from eye 27 to the text in opening 23, a being the distance between the mirror and the paper tape. Since this accommodation requires some time, and since frequent accommodations are tiring to the eye, this would detract from the usefulness of the apparatus.

In order to avoid this inconvenience, according to the invention the mirror is situated at an angle which differs from the normal angle to rays in the field of vision, i.e. to rays in the longitudinal direction of said field of vision. This causes rays from the viewer to be reflected into the apparatus by the mirror. With the position shown, in which the mirror forms an angle of about 78° to the horizontal plane, the ray of light 28 will be reflected as a ray 29 (a perpendicular to the mirror is shown as a straight line N—N), and this ray 29 is caught by the inner wall of the apparatus in a point situated at a distance $b$ from the point of reflection on the mirror, which approximates the distance $a$ from the same point to the text in opening 23. If the inside of the housing is not quite dark, eye 27 will see a mirror image of the foremost part of the inside of the housing and this mirror image will have substantially the same optical distance from the eye as will the text in opening 23. When the lamp is switched off the eye will accordingly not attempt to accommodate.

The shown position of the mirror is therefore particularly advantageous because it will give a mirror image with the said optical distance, whereby it is observed that differences of distance of a few centimetres have no importance, bearing in mind that a normal reading distance from eye to text will be of a size around 40 centimetres.

Since furthermore there will normally be comparative darkness inside the housing when the lamp is switched off, the eye will ordinarily only receive the impression of darkness in largely the same optical distance as the text in opening 23. It is therefore not absolutely necessary that the distance of the mirror from the text is such as to give an image of the inner wall of the housing at the same distance from the mirror as the text.

It is not necessary to convey the paper tape in a horizontal path. The apparatus may be arranged in such a manner that the visible part of the text tape is placed in an oblique or vertical plane, which, however, in all instances should be substantially at right angles to a vertical normal plane through window 4. The path of the tape may be curved if this is expedient with respect to the construction of the apparatus as a whole, and rollers for winding or unwinding the reel may be placed inside the housing.

In a practical embodiment of the apparatus, roller 11 has a circumference of 33 mm., and in tachistoscope training a paper tape is used having a distance between the words of 11 mm., whereby three words will pass under opening 23 each time roller 11 turns one revolution. Since the wheel which activates the microswitch is triangular, the lamp will give one flash for each word. The speed is adjusted by button 12, and a scale 30 belonging to this button is preferably calibrated to directly show the number of words per minute, as suggested in FIG. 1.

When the apparatus is to be used as a tachistoscope, the text tape is first inserted in the paper path by being introduced through slot 21, and to this end button 14 is employed. Subsequently switches 5 and 6 are opened, switch 7 is set at TAC, switch 8 at FORW and button 12 at the desired speed. When the apparatus is to be used as a reading accelerator, the paper tape with the text is inserted in the paper path, switch 7 is set at ACC and the other switches are set as when the apparatus is used as tachistoscope. When the apparatus is to be used as pacer, the paper reel is removed and the plate is inserted through opening 22, switch 5 is set at MOTOR, switch 6 at OFF, switch 7 at any setting and switch 8 at BACK. The plate will thereafter appear and move outwardly through slot 21 with the desired speed determined by the regulator button 12, and gradually cover the text in a book or similar reading material placed in front of the apparatus.

I claim:

1. A tachistoscope containing means for conveying a tape containing a text selected from the class comprising single words, whole sentences and coherent texts, said texts to be read through an optical opening in the front wall of the apparatus and being only visible in a limited amount at a time through an interspace between obstacles for the view fixedly arranged in the interior of the apparatus, said apparatus also comprising a transparent mirror placed between the said interspace and the viewer, and said apparatus furthermore containing a driving means for the conveyance means and a source of light adapted to shine intermittently and in synchronism with the conveying of the text tape, wherein the improvement comprises that the transparent mirror is placed between the interspace between the said fixedly arranged obstacles in the interior of the apparatus and the optical opening in the front wall at such an angle with straight lines from the viewer to the said interspace that the transparent mirror reflects substantially all of the mirror image of the viewer into the interior of the apparatus.

2. A tachistoscope as claimed in claim 1, wherein the transparent mirror (26) is a plane mirror and so placed that any straight line running lengthwise in the field of vision defined by the fixedly arranged viewing obstacles in the apparatus and the edges of the optical opening in the front wall of the apparatus forms an angle with the mirror differing from 90°.

3. A tachistoscope as claimed in claim 1, wherein the transparent mirror (26) is plane and so placed that a ray of light falling into the apparatus and being parallel with a plane perpendicular to the front wall (3) and to the text tape (17) and furthermore running within the field of vision defined by the upper and lower edges of the fixedly arranged view-obstacles in the apparatus and the optical opening in the front wall is reflected onto a point of the inner wall of the apparatus which is substantially the same distance from the point of reflection as the distance from the said point to the text tape, measured in the direction of the ray of light.

4. A tachistoscope as claimed in claim 3, wherein the conveying means are arranged so as to convey the text in a substantially horzontal plane, the front wall of the apparatus forming an angle of 35–55° with the horizontal plane, the mirror (26) being slightly tilted in a direction away from the viewer and forming an angle of at least about 70° with the horizontal plane, said mirror being so placed that a point in its reflecting surface situated halfway between the upper side and the underside of the field of vision defined as in claim 3 forms the apex of an isosceles triangle the two other vertices of which are situated in or near the middle of the visible text, and in a point of the inner walls of the apparatus near its front edge, respectively.

5. A tachistoscope as claimed in claim 4, wherein the angle of the front wall with the horizontal plane is approximately 45°.

6. A tachistoscope as claimed in claim 1, which is adapted to function also as a reading accelerator, wherein the source of light is adapted to shine constantly when the apparatus is used as a reading accelerator.

7. A tachistoscope as claimed in claim 1, which is adapted to function also as a reading pacer, wherein the conveying means are also adapted to convey a removable, opaque plate in a direction out of the apparatus towards the viewer, the driving means for the conveying means having reversible direction of movement.

References Cited
UNITED STATES PATENTS

| | | | |
|---|---|---|---|
| 2,535,243 | 12/1950 | Taylor | 35—35.2 |
| 2,915,833 | 12/1959 | Genest | 35—35.2 X |
| 2,984,916 | 5/1961 | Balchuns | 35—35.2 |
| 3,179,004 | 4/1965 | Stoyanoff et al. | 35—35.2 X |

LAWRENCE CHARLES, Primary Examiner